Nov. 29, 1927.　　　　　　　　　　　　　　　　　1,650,893
W. KOEHLER
PROCESS FOR THE PRODUCTION OF MAGNESIUM FROM MAGNESIA COMPOUNDS
Filed Jan. 27, 1926　　　　2 Sheets-Sheet 1
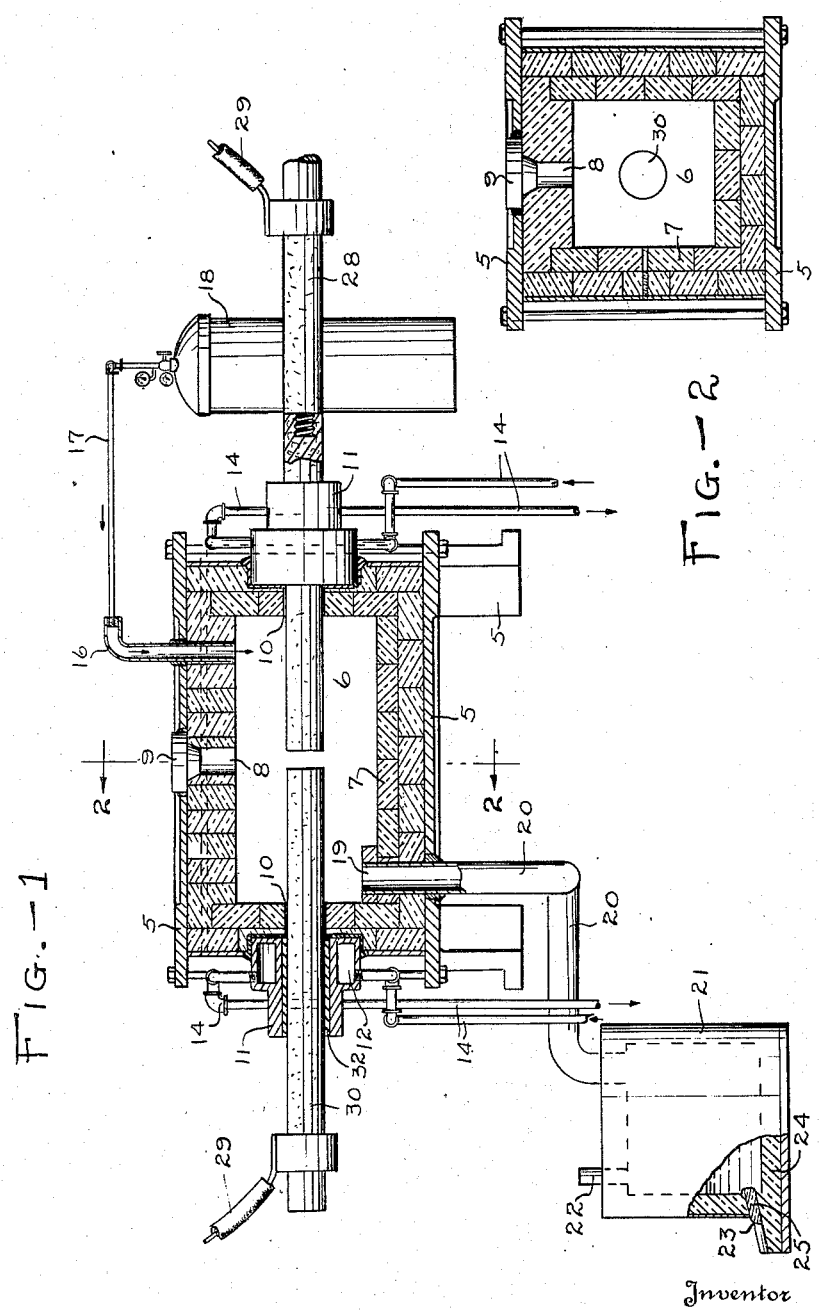
Inventor
William Koehler
By Albert E. Lynch.
Attorney

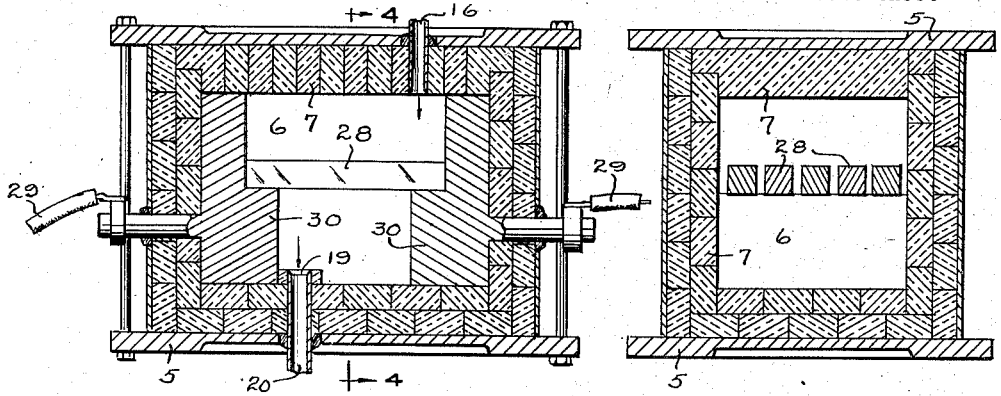
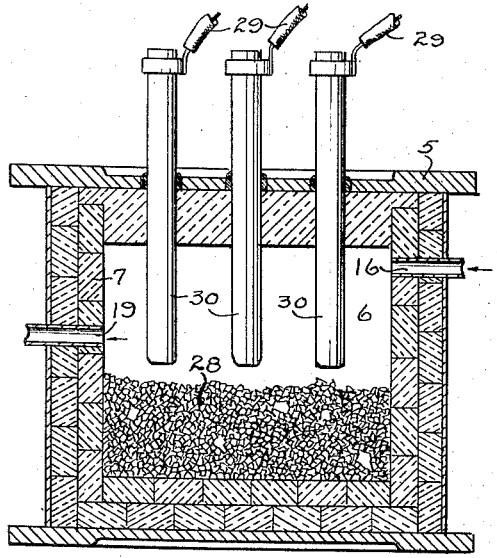
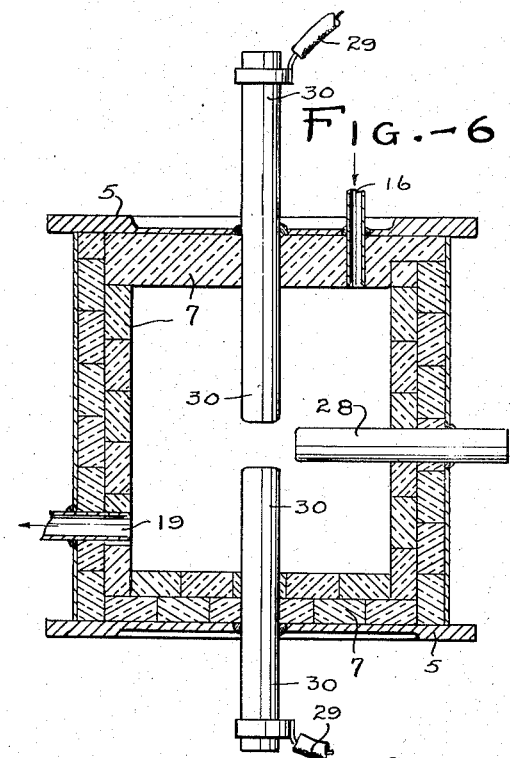

Patented Nov. 29, 1927.

1,650,893

UNITED STATES PATENT OFFICE.

WILLIAM KOEHLER, OF CLEVELAND, OHIO.

PROCESS FOR THE PRODUCTION OF MAGNESIUM FROM MAGNESIA COMPOUNDS.

Application filed January 27, 1926. Serial No. 84,104.

This invention relates to an improved process for the production of magnesium from magnesia compounds such as magnesium oxide or magnesium carbonate and other magnesium bearing materials.

One object of my invention is to provide a process for the production of magnesium which can be carried on continuously.

Another object of my invention is to produce the magnesium in a practically pure condition, free from chlorine or other halogen derivatives.

In carrying out my process I take a quantity of a magnesia compound such as a magnesium oxide or magnesium carbonate or a quantity of a magnesium bearing material and reduce the same to a comminuted condition. I then take a quantity of a carbonaceous material and reduce it to a comminuted condition. I then intimately mix the comminuted materials and add to the said mixture a suitable binder material, such as tar. The mixed materials may then be pressed or otherwise shaped into definite forms such as bars, rods or lumps.

The forms after being shaped are baked at a sufficiently high temperature to carbonize the binder material and partially or wholly convert any magnesium carbonate to the oxide and also to impart such a degree of stability to the forms as will permit of the same being handled without the danger of breaking. Under some conditions it may be advisable to reduce the baked forms to a granular condition.

The magnesia carbon product thus formed is then subjected to an intense heat in the presence of a reducing atmosphere, such as a hydrogen or a hydrocarbon atmosphere. The required reaction can best be secured through the utilization of the electric current.

In carrying out my process the masses or forms of the magnesia compound are subjected to the action of intense heat and an electric current and to this end may be included as a resistor in an electric circuit, that is made an integral part of an electric circuit or the forms may be fed into a heated zone produced by an electric current or may be fed into the arc produced at the poles or electrodes of an electric circuit.

When employing the last method the arc may be produced between a carbon electrode and an electrode formed of a magnesia carbon product or between two electrodes, both of which are formed of the magnesia carbon product.

Referring to the accompanying drawings, Fig. 1 is a view mostly in central section showing a type of furnace and other apparatus for carrying out my process; Fig. 2 is a section on line 2—2 Fig. 1; Fig. 3 is a view in central section showing a resistor type of furnace, which may be used instead of the furnace shown in Fig. 1; Fig. 4 is a section on line 4—4 Fig. 3; Fig. 5 and Fig. 6 are views in central section showing types of phase furnaces which may also be employed in carrying out my process.

Again referring to the drawings and particularly to Fig. 1 and Fig. 2, 5 represents any suitable enclosure or casing providing a closed chamber 6. The dimensions of the chamber 6 are theoretically immaterial but for practical commercial use it is advisable to construct the enclosure or casing on a relatively confined scale and this makes it necessary to build the casing or enclosure similar to the usual construction of the body of an electric furnace of the customary type, and for the same reason we will generally refer to the enclosure as a furnace.

The furnace casing 5 is preferably lined in the usual manner with a refractory or other heat resisting material 7 capable of withstanding a high temperature and which cannot be reduced or acted upon by magnesium vapors. The chamber 6 is preferably provided with a safety vent 8, which may be sealed by a plug 9.

At the opposite ends of the casing or furnace 5 are formed openings 10, in line with each other. On the outside of the furnace around these openings are mounted stuffing boxes 11, which may be made of carbon, tungsten or some other suitable material having an extremely high melting point. These stuffing boxes 11 are shown provided with passageways 12 for circulating any suitable cooling medium, supplied by the pipes 14. The top of the furnace is provided with an inlet connection 16 and a pipe 17 extends from this inlet connection to a container 18 holding a hydrocarbon, hydrogen or other suitable reducing agent or medium.

In the lower part of the furnace is an outlet 19, which is connected by a conduit 20, with a suitable receptacle 21. The receptacle 21 is provided with an outlet 22 at its top and a drain opening 23 at its bottom. The receptacle 21 is preferably lined with a suitable refractory material 24 and the drain opening 23 is provided with a plug 25 of similar material.

In carrying out my process with the furnace and the apparatus just described, the magnesia carbon product in the form of a rod or electrode 28 is inserted through the stuffing box at one end of the furnace and the outer end thereof is connected to one terminal of an electric circuit 29. The electric circuit should have a high amperage and sufficient voltage to draw the required arc. A carbon electrode 30 is inserted through the other stuffing box of the furnace and its outer end is connected with the other terminal of the circuit 29. The magnesia carbon product may be employed for both electrodes but the use of the comparatively permanent carbon electrode simplifies the mechanism necessary for feeding the material to the furnace.

After the electrodes have been inserted in the furnace the hydrogen, hydrocarbon or other suitable reducing atmosphere is admitted to the chamber from the container 18 until the said chamber 6 is completely filled with the vapor thereof. The electric current is then turned on and the electrodes are adjusted to secure the required arc. At the enormous temperatures thus obtained, the hydrogen gas is to a greater or less degree ionized, or dissociated, and the ionized gas reacts with the intensely heated magnesium oxide and reduces it, liberating metallic magnesium in the vapor form, and forming water vapor, both vapors being carried along by the stream of excess hydrogen flowing through the furnace.

The magnesium oxide is reduced to the metallic state in conjunction with the formation of aqueous vapor, if hydrogen be used and aqueous vapor, carbon dioxide and carbon monoxide if a hydrocarbon be used.

The magnesium being volatile distils with the other volatile products of the reaction into the receptacle 21. The magnesium vapor when brought down to a temperature below 1200° Cen. condenses to a liquid and the other vapors and gases escape through the outlet 22. From time to time the molten magnesium may be trapped from the receptacle 21.

In Fig. 3 and Fig. 4, I have shown a resistor type of furnace. The electrodes shown at 30 are formed of carbon in the usual manner and the magnesia carbon product in the form of bars 28 extend between the electrodes 30 and constitute the resistors.

Fig. 5 shows a multiphase furnace and Fig. 6 shows a furnace employing two carbon electrodes to produce an arc and the magnesia carbon product in the form of a rod is fed into the arc.

In view of the unusual conditions existing in the furnace during the operation of the process the actual phenomena taking place are not clearly understood. It may be that magnesium oxide is vaporized and immediately thereafter reduced to magnesium in a vapor form while still in the sphere of the arc current; or it may be that at the high temperature existing on the surface of the electrode the magnesium oxide is reduced on the surface of the electrode to a metallic state and the magnesium carried off in vapor form by the current of excess gas.

From the foregoing it will be understood that I do not desire to limit myself to any specific type of furnace or apparatus as various modifications of the apparatus and furnaces shown may be employed or an entirely different type of furnace may be employed, such as a high frequency induction furnace.

What I claim is:—

1. The process of reducing a magnesium compound to metallic magnesium which comprises intensely heating the magnesium compound to a reacting temperature in a current of hydrogen gas, said hydrogen being heated to the same temperature, and reducing the intensely heated magnesium compound to metallic magnesium by the hydrogen, conducting the vapors of the reduced metallic magnesium by the current of excess hydrogen out of the furnace and condensing the metal in the presence of said hydrogen.

2. The process for the reduction of magnesium compounds to magnesium consisting in forming a bar or rod of a mixture of a comminuted magnesium compound and a comminuted carbonaceous material, connecting said bar to one terminal of an electric circuit to form an electrode, connecting any suitable electrode to the other terminal of said electric circuit and then bringing the electrodes sufficiently close together to form an arc and supplying a reducing atmosphere around the said electrodes, reducing said magnesium compound to metallic magnesium by the conjoint reaction of intensely heated reducing atmosphere and intensely heated carbon, conducting the reduced vapors of metallic magnesium out of the furnace by the reducing atmosphere and condensing said magnesium vapors while in said reducing atmosphere.

3. The process of obtaining metallic magnesium from a charge containing magnesium compounds, which comprises heating said charge to reacting conditions in a stream of hydrogen containing gas while subjected to the conjoint reducing action of carbon and the gas, removing the vapors of metallic magnesium from the sphere of reaction by the stream of gas and condensing said vapors of magnesium while in said gas.

In testimony whereof I affix my signature.

WILLIAM KOEHLER.